UNITED STATES PATENT OFFICE.

FRANZ WEBEL, OF MANNHEIM, GERMANY, ASSIGNOR TO BADISCHE ANILIN & SODA FABRIK, OF LUDWIGSHAFEN-ON-THE-RHINE, GERMANY, A CORPORATION.

PRODUCING ISOPRENE.

1,083,164.

No Drawing.

Specification of Letters Patent. Patented Dec. 30, 1913.

Application filed February 20, 1912. Serial No. 678,896.

*To all whom it may concern:*

Be it known that I, FRANZ WEBEL, subject of the King of Bavaria, residing at Mannheim, Germany, have invented new and useful Improvements in Producing Isoprene, of which the following is a specification.

I have discovered that I can obtain isoprene from asymmetrical dimethyl-allene ($H_2C=C=C(CH_3)_2$) by heating the latter with a contact substance containing alumina, preferably *in vacuo*.

The following example will serve to illustrate further the nature of this invention, which, however, is not confined to this example: Asymmetrical dimethyl-allene of boiling point from 39° to 41° C. is passed, in the form of vapor, through a tube containing granulated alumina heated to about 300° C., which is provided with means on one side for allowing the dimethyl-allene to be supplied drop by drop and is connected on the other side with a vacuum pump so as to maintain a pressure of from 20 to 30 millimeters. The vapors leaving the tube pass through a condenser cooled with carbon dioxid and ether, whereupon practically pure isoprene of boiling point 32° to 34° C. is obtained.

Now what I claim is:—

1. The process of preparing isoprene which consists in passing the vapors of asymmetrical dimethylallene over a heated catalytic agent.

2. The process of producing isoprene by heating asymmetrical dimethyl-allene with alumina.

3. The process of producing isoprene by heating asymmetrical dimethyl-allene with alumina *in vacuo*.

4. The process of producing isoprene by passing vaporized asymmetrical dimethylallene over alumina at a temperature of about 300° C. and at a pressure of about from 20 to 30 millimeters.

In testimony whereof I have hereunto set my hand in the presence of two subscribing witnesses.

FRANZ WEBEL.

Witnesses:
 J. ALEC. LLOYD,
 A. O. TILLMANN.